(12) United States Patent
Lee

(10) Patent No.: US 9,028,665 B2
(45) Date of Patent: May 12, 2015

(54) DRUM-TYPE ELECTRO-OSMOSIS DEHYDRATOR CAPABLE OF REDUCING ELECTRICITY CONSUMPTION BY DECREASING GAP BETWEEN POSITIVE AND NEGATIVE ELECTRODES

(75) Inventor: Sang Joon Lee, Busan (KR)

(73) Assignee: Fine Inc., Busan (KR)

( * ) Notice: Subject to any disclaimer, the term of this patent is extended or adjusted under 35 U.S.C. 154(b) by 288 days.

(21) Appl. No.: 13/574,904

(22) PCT Filed: Sep. 30, 2011

(86) PCT No.: PCT/KR2011/007229
§ 371 (c)(1),
(2), (4) Date: Oct. 3, 2012

(87) PCT Pub. No.: WO2013/002454
PCT Pub. Date: Jan. 3, 2013

(65) Prior Publication Data
US 2013/0015070 A1    Jan. 17, 2013

(30) Foreign Application Priority Data

Jun. 27, 2011 (KR) .......................... 10-2011-0062086

(51) Int. Cl.
| | |
|---|---|
| *B01D 35/06* | (2006.01) |
| *C02F 1/469* | (2006.01) |
| *C02F 11/00* | (2006.01) |
| *B01D 61/42* | (2006.01) |
| *C02F 11/12* | (2006.01) |

(52) U.S. Cl.
CPC .............. *C02F 1/4698* (2013.01); *C02F 11/006* (2013.01); *B01D 61/427* (2013.01); *C02F 11/123* (2013.01); *C02F 2201/4617* (2013.01)

(58) Field of Classification Search
USPC ......................................... 204/648, 649, 650
See application file for complete search history.

(56) References Cited

U.S. PATENT DOCUMENTS 7,097,747 B1 *   8/2006   Herceg et al. ................. 204/201

FOREIGN PATENT DOCUMENTS

| EP | 0512287 A1 | 11/1992 |
|---|---|---|
| JP | 2009-045587 A | 3/2009 |

(Continued)

OTHER PUBLICATIONS

International Search Report of PCT/KR2011/007229, dated May 9, 2012.

*Primary Examiner* — Arun S Phasge
(74) *Attorney, Agent, or Firm* — Maxon IP, LLC; Justin H. Kim

(57) ABSTRACT

Provided is an electro-osmosis dehydrator, which includes a sludge supplying part disposed in a central upper portion thereof, and including a rotating part and two rollers disposed under the rotating part, a drum disposed under the sludge supplying part to receive sludge, and having a cylindrical shape rotating about an axis thereof, wherein an inner circumference of the drum is charged negatively or positively by direct current power, a caterpillar part spaced a certain distance from the drum, and moving along an endless track, wherein the caterpillar part includes a power applying part charged with polarity opposite to that of the drum by direct current power, a filtering fabric disposed under the power applying part, a caterpillar disposed under the filtering fabric, and including a plurality of holes, a vinyl part disposed between the filtering fabric and the caterpillar to prevent the sludge from passing through the caterpillar, and a chain disposed under the caterpillar, and a plurality of idle sprocket parts disposed on the inside of the caterpillar part, and engaging with the chain to drive the caterpillar part. A filtering fabric is removed from the space between positive and negative electrodes so as to decrease the gap therebetween, thereby reducing electricity consumption.

4 Claims, 4 Drawing Sheets

(56) References Cited

FOREIGN PATENT DOCUMENTS

| KR | 10-2007-0081993 A | 8/2007 |
| KR | 10-0860979 B1 | 9/2008 |
| KR | 10-2010-0131954 A | 12/2010 |

* cited by examiner

DRUM-TYPE ELECTRO-OSMOSIS DEHYDRATOR CAPABLE OF REDUCING ELECTRICITY CONSUMPTION BY DECREASING GAP BETWEEN POSITIVE AND NEGATIVE ELECTRODES

TECHNICAL FIELD

The present invention disclosed herein relates to a drum-type electro-osmosis dehydrator, and more particularly, to a drum-type electro-osmosis dehydrator capable of reducing electricity consumption by decreasing a gap between positive and negative electrodes.

BACKGROUND ART

Electro-osmosis dehydrators use direct current (DC) power to form an electric field for removing water from sludge through electrophoresis and a voltage difference caused according to application of the DC power.

Such electrophoretic electro-osmosis dehydrators are disclosed in Korean Patent Application No. 10-2004-0007759 titled "ELECTRO-OSMOSIS DEHYDRATOR"; Korean Patent Application No. 10-2005-0009928, titled "PHASE CONTROL-TYPE ELECTRIC DEHYDRATOR"; Korean Patent Application No. 10-2007-0046494, titled "ELECTRO-OSMOSIS DEHYDRATOR"; Korean Patent Application No. 10-2008-0044901, titled "PHASE CONTROL-TYPE ELECTROPHORETIC ELECTRO-OSMOSIS DEHYDRATOR USING THREE-PHASE AC POWER"; Korean Patent Application No. 10-2010-0135183, titled "DRUM DEVICE OF ELECTROPHORETIC ELECTRO-OSMOSIS DEHYDRATOR HAVING IMPROVED ELECTRICAL CONDUCTIVITY, which was previously applied by the applicant of the present invention; Korean Patent Application No. 10-2010-0135185, titled "WASHING DEVICE OF ELECTROPHORETIC ELECTRO-OSMOSIS DEHYDRATOR; and Korean Patent Application No. 10-2010-0135188, titled "DIGITAL CONTROL CIRCUIT AND SYSTEM of PHASE CONTROL-TYPE ELECTROPHORETIC ELECTRO-OSMOSIS DEHYDRATOR USING THREE-PHASE AC POWER". The electrophoretic electro-osmosis dehydrators include: a drum charged positively or negatively; a caterpillar spaced a certain distance from the drum, and entirely charged with polarity opposite to that of the drum; and a filtering fabric belt wound between the drum and the caterpillar to transfer and dehydrate sludge.

Constant pure DC voltage is applied across the drum and the caterpillar to form an electric field, and water surrounding sludge particles charged in the electric field is moved to an electrode charged with polarity opposite to that of the sludge particles, by electrophoresis and osmosis, thereby dehydrating sludge.

That is, since the surface of the sludge particles is negatively charged, when the electric field is applied to the sludge, the sludge particles are moved to a positive electrode, and water in a sludge particle layer is moved to a negative electrode, thereby facilitating the dehydration of the sludge.

Such electro-osmosis dehydrators require a certain gap between a positive electrode and a negative electrode, that is, between a drum and a caterpillar, and the efficiency of an electro-osmosis dehydrator depends on the gap between a positive electrode and a negative electrode. However, a filtering fabric disposed between the positive and negative electrodes degrades electrical conductivity therebetween, and increases the distance therebetween.

Moreover, the service life of such filtering fabrics are limited to about 6 months to about 9 months, and thus, a filtering fabric should be frequently replaced with a new one.

DISCLOSURE OF THE INVENTION

Technical Problem

The present invention provides an electro-osmosis dehydrator capable of reducing electricity consumption by decreasing a gap between positive and negative electrodes.

The present invention also provides an electro-osmosis dehydrator with a filtering fabric absent between positive and negative electrodes, thereby decreasing a gap therebetween and increasing electrical conductivity therebetween.

The present invention also provides an electro-osmosis dehydrator without a filtering fabric as a consumable, thereby decreasing costs thereof The present invention also provides an electro-osmosis dehydrator that efficiently performs a dehydrating operation without the leakage of a sludge fluid.

Technical Solution

Embodiments of the present invention provide electro-osmosis dehydrators including: a sludge supplying part disposed in a central upper portion thereof, and including a rotating part and two rollers disposed under the rotating part; a drum disposed under the sludge supplying part to receive sludge, and having a cylindrical shape rotating about an axis thereof, wherein an inner circumference of the drum is charged negatively or positively by direct current power; a caterpillar part spaced a certain distance from the drum, and moving along an endless track, wherein the caterpillar part includes: a power applying part charged with polarity opposite to that of the drum by direct current power; a filtering fabric disposed under the power applying part; a caterpillar disposed under the filtering fabric, and including a plurality of holes; a vinyl part disposed between the filtering fabric and the caterpillar to prevent the sludge from passing through the caterpillar; and a chain disposed under the caterpillar; and a plurality of idle sprocket parts disposed on the inside of the caterpillar part, and engaging with the chain to drive the caterpillar part.

In some embodiments, the caterpillar part may further include: a plastic bolt fixed to the caterpillar to protrude upward from the power applying part, and preventing short-circuiting between the drum and the caterpillar part; and an elastic body disposed on the caterpillar, and providing flexibility to the caterpillar to prevent the sludge from leaking between the drum and the caterpillar part.

In other embodiments, the idle sprocket parts may include a second idle sprocket that is spaced a certain distance from the drum in order to perform a preliminary dehydrating operation.

In still other embodiments, the electro-osmosis dehydrators may further include: a brush part neighboring a final idle sprocket to remove sludge from the caterpillar; a screw conveyor part disposed under the brush part to collect and discharge completely dehydrated sludge; and a washing part disposed on an opposite side of the electro-osmosis dehydrator to the brush part, and spraying water to the caterpillar part to clean the caterpillar part.

Advantageous Effects

According to the embodiments of the present invention, a filtering fabric is removed from the space between positive and negative electrodes so as to decrease the gap therebetween, thereby reducing electricity consumption.

In addition, since the filtering fabric, which degrades electrical conductivity and is a consumable, is removed, costs can be saved.

In addition, a preliminary dehydrating process can be performed, and a vinyl part prevents the leakage of a sludge fluid, to thereby efficiently perform a dehydrating process.

While the present invention has been particularly shown and described with reference to exemplary embodiments thereof, it will be understood by those of ordinary skill in the art that various changes in form and details may be made therein. Hence, the real protective scope of the present invention shall be determined by the spirit and scope of the following claims.

MODE FOR CARRYING OUT THE INVENTION

Figure 1:
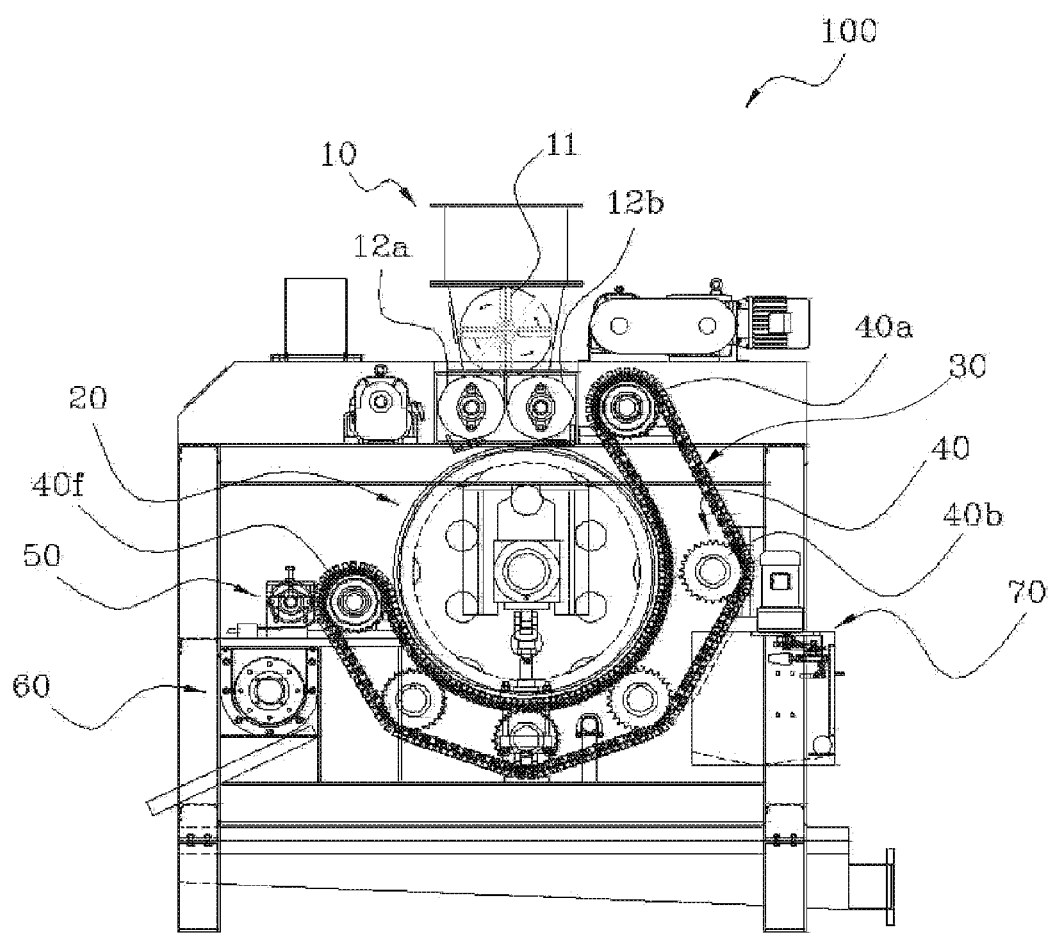
FIG. 1 is a front view illustrating an electro-osmosis dehydrator according to an embodiment of the present invention.
Figure 2:
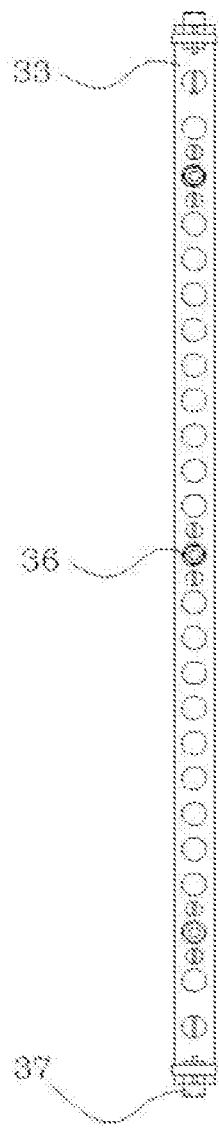
FIG. 2 is a schematic view illustrating a caterpillar of the electro-osmosis dehydrator of FIG. 1.
Figure 3:
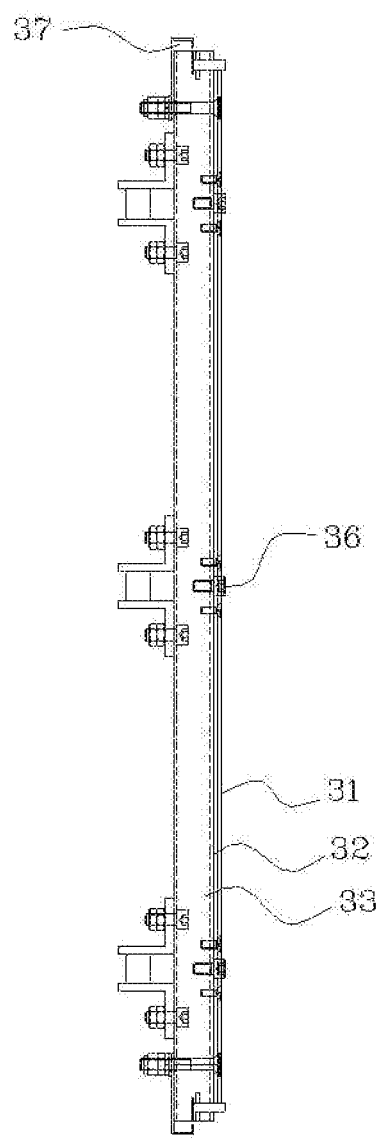
FIGS. 3 and 4 are schematic views illustrating a caterpillar part of the electro-osmosis dehydrator of FIG. 1.
Figure 4:
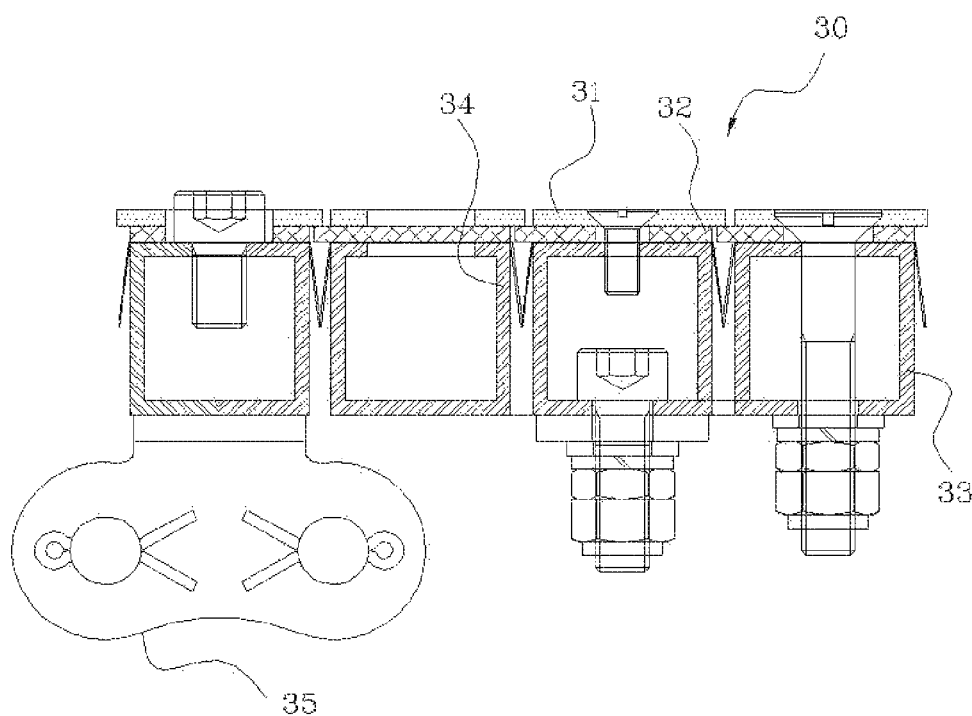

Hereinafter, a drum-type electro-osmosis dehydrator capable of reducing electricity consumption by decreasing a gap between positive and negative electrodes according to preferred embodiments of the present invention will be described in detail with reference to the accompanying drawings. FIG. 1 is a front view illustrating an electro-osmosis dehydrator according to an embodiment of the present invention. FIG. 2 is a schematic view illustrating a caterpillar of the electro-osmosis dehydrator of FIG. 1. FIGS. 3 and 4 are schematic views illustrating a caterpillar part of the electro-osmosis dehydrator of FIG. 1.

Referring to FIGS. 1 to 4, as a drum-type electro-osmosis dehydrator capable of reducing electricity consumption by decreasing a gap between positive and negative electrodes, an electro-osmosis dehydrator 100 according to the current embodiment includes a sludge supplying part 10, a drum 20, a caterpillar part 30, and a plurality of idle sprocket parts 40.

The sludge supplying part 10 is disposed in the central upper portion of the electro-osmosis dehydrator 100. The sludge supplying part 10 includes a rotating part 11 and first and second rollers 12a and 12b. When sludge is introduced into the sludge supplying part 10, the rotating part 11 rotates the sludge, and the first and second rollers 12a and 12b disposed under the rotating part 11 facilitate the introduction of the sludge.

The drum 20 is disposed under the sludge supplying part 10. The drum 20 has a cylindrical shape rotating about an axis thereof, and the inner circumference of the drum 20 is charged negatively or positively by direct current (DC) power. The drum 20 dehydrates the introduced sludge.

The caterpillar part 30 is spaced a certain distance from the drum 20, and moves along an endless track. The caterpillar part 30 includes a power applying part 31, a filtering fabric 32, a caterpillar 33, a vinyl part (web) 34, a chain 35, a plurality of plastic bolts 36, and a plurality of elastic bodies 37. The power applying part 31 is charged with polarity opposite to that of the drum 20 by DC power.

The filtering fabric 32 is disposed under the power applying part 31. In the related art, a filtering fabric of an electro-osmosis dehydrator is disposed above a power applying part, that is, between a drum and a caterpillar, thereby increasing a gap between a positive electrode and a negative electrode, decreasing electrical conductivity, and requiring frequent replacement with a new filtering fabric. However, the filtering fabric 32 is disposed between the power applying part 31 and the caterpillar 33 disposed under the power applying part 31, thereby decreasing the gap between a positive electrode and a negative electrode, and facilitating the dehydration of sludge. Furthermore, the filtering fabric 32 can be used semi-permanently.

The caterpillar 33 is disposed under the filtering fabric 32. A plurality of holes are disposed in the caterpillar 33, and water removed from slug passes through the holes. The vinyl part 34 is disposed between the filtering fabric 32 and the caterpillar 33. The vinyl part 34 may prevent sludge from passing through the caterpillar 33.

The chain 35 is disposed under the caterpillar 33. The chain 35 and the idle sprocket parts 40 to be described later may drive the caterpillar part 30. The plastic bolts 36 are fixed to the caterpillar 33 to protrude upward from the power applying part 31. The plastic bolts 36 may prevent short-circuiting between the drum 20 and the caterpillar part 30.

The elastic bodies 37 are disposed on both sides of the caterpillar 33. The elastic bodies 37 provide flexibility to the caterpillar 33 to prevent sludge from leaking between the drum 20 and the caterpillar part 30. That is, when the caterpillar part 30 moves along an endless track, the elastic bodies 37 flexibly adjusts the gap between the caterpillar 33 and the drum 20, so as to prevent the leakage of sludge.

The idle sprocket parts 40 are is disposed on the inside of the caterpillar part 30, and engage with the chain 35 to drive the caterpillar part 30. For example, the number of the idle sprocket parts 40 may be six. A first idle sprocket 40a neighbors the second roller 12b of the sludge supplying part 10. Sludge to be dehydrated is introduced into a space that is formed by the first idle sprocket 40a, the drum 20, and the caterpillar part 30.

A second idle sprocket 40b is spaced a certain distance from the drum 20 to prevent pressure from being applied between the drum 20 and the caterpillar part 30. Accordingly, the introduced sludge is preliminarily dehydrated. That is, water may be preliminarily removed from the sludge before being pressed.

A brush part 50 neighbors a sixth idle sprocket 40f. The brush part 50 removes sludge from the caterpillar part 30. Sludge caught by the vinyl part 34 of the caterpillar part 30 is removed by the brush part 50.

A screw conveyor part 60 is disposed under a brush part 50. The screw conveyor part 60 collects completely dehydrated sludge, and discharges the sludge to the outside. Both the sludge removed by the brush part 50 and the completely dehydrated sludge are discharged by the screw conveyor part 60.

A washing part 70 is disposed on an opposite side of the electro-osmosis dehydrator 100 to the brush part 50. The washing part 70 sprays water to the caterpillar part 40 to clean it.

Industrial Applicability

While the present invention has been particularly shown and described with reference to the above embodiments thereof, it will be understood by those of ordinary skill in the art that various changes in form and details may be made therein without departing from the spirit and scope of the present invention.

The invention claimed is:

1. An electro-osmosis dehydrator comprising:

a sludge supplying part disposed in a central upper portion thereof, and comprising a rotating part and two rollers being so disposed under the rotating part that when sludge is provided to the sludge supplying part, the rotating part begin to rotate and then the sludge enter to the lower part of the rotating part and causes each of the two rollers counterrotate to pass the sludge therebetween;

a drum being so disposed under the sludge supplying part that the drum receives the sludge from the sludge supplying part, and having a cylindrical shape rotating about an axis thereof, wherein an inner circumference of the drum is charged negatively or positively by direct current power;

a caterpillar part being so spaced a certain distance from the drum that the sludge from the sludge supply part can pass through between the drum and the caterpillar part, and moving along an endless track, wherein the caterpillar part comprises:

a power applying part charged with polarity opposite to that of the drum by direct current power;

a filtering fabric disposed under the power applying part;

a caterpillar disposed under the filtering fabric, and comprising a plurality of holes;

a vinyl part disposed between the filtering fabric and the caterpillar to prevent the sludge from passing through the caterpillar; and a chain disposed under the caterpillar; and a plurality of idle sprocket parts disposed on the inside of the caterpillar part, and engaging with the chain to drive the caterpillar part.

2. The electro-osmosis dehydrator of claim 1, wherein the caterpillar part further comprise:

a plastic bolt fixed to the caterpillar to protrude upward from the power applying part, and preventing short-circuiting between the drum and the caterpillar part; and an elastic body being so disposed on the caterpillar that when the caterpillar part moves along an endless track, the elastic body flexibly adjusts the gap between the caterpillar and the drum thereby providing flexibility to the caterpillar to prevent the sludge from leaking between the drum and the caterpillar part.

3. The electro-osmosis dehydrator of claim 1, wherein the idle sprocket parts comprises a second idle sprocket that is so spaced a certain distance from the drum that when the sludge passes through between the caterpillar part and the drum, the second idle sprocket performs a preliminary dehydrating operation by providing less pressure thereof.

4. The electro-osmosis dehydrator of claim 1, further comprising:

a brush part neighboring a final idle sprocket to remove sludge from the caterpillar;

a screw conveyor part disposed under the brush part to collect and discharge completely dehydrated sludge; and a washing part being so disposed in the lower portion of the electro-osmosis dehydrator that the washing part is capable of spraying water to the caterpillar part to clean the caterpillar part.

* * * * *